United States Patent [19]

Zecher et al.

[11] Patent Number: 5,004,795

[45] Date of Patent: Apr. 2, 1991

[54] ALIPHATIC-AROMATIC POLYAMIDE-IMIDES

[75] Inventors: Wilfried Zecher; Aziz El-Sayed, both of Leverkusen; Wilfried Haese, Moenchengladbach; Burkhard Köhler; Rolf-Volker Meyer, both of Krefeld, all of Fed. Rep. of Germany

[73] Assignee: Bayer Aktiengesellschaft, Leverkusen-Bayerwerk, Fed. Rep. of Germany

[21] Appl. No.: 396,145

[22] Filed: Aug. 21, 1989

[30] Foreign Application Priority Data

Sep. 3, 1988 [DE] Fed. Rep. of Germany ....... 3829960

[51] Int. Cl.[5] .............................................. C08G 18/38
[52] U.S. Cl. .................................................... 528/73
[58] Field of Search ............................................ 528/73

[56] References Cited

U.S. PATENT DOCUMENTS 3,518,230 6/1970 Shaffer et al. ........................ 528/73

FOREIGN PATENT DOCUMENTS 2009626 9/1970 Fed. Rep. of Germany .
2006201 4/1969 France .

OTHER PUBLICATIONS

Die Makromolekulare Chemie, Mar. 1982, pp. 557–569 and 571–578, Basel, CH; J. L. Nieto et al.

*Primary Examiner*—Maurice J. Welsh
*Attorney, Agent, or Firm*—Connolly and Hutz

[57] ABSTRACT

The invention relates to aliphatic-aromatic polyamide-imides and their use for the production of shaped articles.

8 Claims, No Drawings

ALIPHATIC-AROMATIC POLYAMIDE-IMIDES

The invention relates to aliphatic-aromatic polyamide-imides and their use for the production of shaped articles. It is known that aliphatic-aromatic polyamide-imides can be prepared by reaction of polyisocyanates with cyclic polycarboxylic acid anhydrides and lactams (DE-AS 1770202) or polyamides (DE-AS 1956512). These polyamide-imides have particular properties, such as high softening points and good elasticity values, and can be used as coatings with a high temperature resistance, e.g. in the electrical insulating lacquer sector, or as thermoplastics. It is furthermore known that aliphatic-aromatic polyamide-imides are obtained by condensation of polyisocyanates with trimellitimidocarboxylic acids (Makromol. Chem. 183, 557 and 571 [1982]).

It has now been found that aliphatic-aromatic polyamide-imides which are obtained by condensation of organic diisocyanates, such as aliphatic, aliphatic-aromatic and aromatic diisocyanates, with trimellitimidocarboxylic acids of the formula (I)

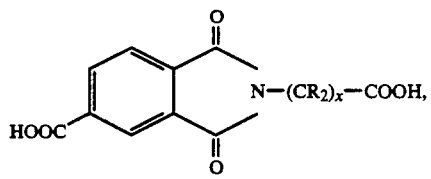

in which
R independently of one another represent hydrogen (H) or $C_1$-$C_6$-alkyl and
X represents the number 1, 2, 3, 4, 5, 6, 7, 8, 9, 10, 11 or 12 at temperatures of 50° to 380° C., preferably 70° to 350° C., can be processed to shaped articles, in particular by injection moulding processes.

The shaped articles according to the invention are distinguished by good mechanical values, such as heat resistance, toughness and good flow properties during processing.

These properties are to be regarded as surprising, since side and crosslinking reactions occurs to a considerable extent by the reaction procedure described in the literature (Makromol. Chem. 183, 557 and 571 [1982]).

The trimellitimidocarboxylic acids which can be used for the preparation of the polyamide-imides according to the invention are accessible e.g. from trimellitic anhydride and lactams or aminocarboxylic acids by known processes.

They can be prepared separately or "in situ", e.g. by heating trimellitic anhydride with a lactam and subsequently adding the other components. The trimellitimidocarboxylic acids correspond to the formula (I)

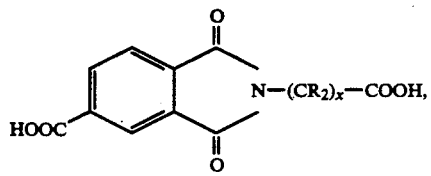

in which

R independently of one another represent hydrogen (H) or alkyl groups with 1-6 C atoms and
x represents the number 1, 2, 3, 4, 5, 6, 7, 8, 9, 10, 11 or 12.

x preferably corresponds to the numbers 5, 10 or 11, and trimellitimidocaproic acid (x=5) is particularly preferably used and/or trimellitimidoundecanoic acid (x=10). Diisocyanates such as are described, for example, in DE-AS 1770202, can be used for the preparation of the polyamide-imides employed according to the invention.

Phosgenated condensates of aniline and formaldehyde with polyphenylenemethylene structures, industrial mixtures of toluylene diisocyanates, m-phenylene diisocyanate and compounds such as 4,4'- and 2,4'-diisocyanatodiphenylmethane, 4,4'-diisocyanato-diphenyl ether, naphthylene 1,5-diisocyanate, p-phenylene diisocyanate, 4,4'-diisocyanato-diphenyl-dimethylmethane, analogous hydro-aromatic diisocyanates, such as 4,4'-diisocyanatodicyclohexylmethane, and aliphatic diisocyanates with 2 to 12 C atoms, such as hexamethylene diisocyanate and isomeric trimethylhexamethylene diisocyanates, and diisocyanates derived from isophorone, are preferably employed.

4,4'- and 2,4'-diisocyanato-diphenylmethane, 2,4- and 2,6-toluylenediisocyanate and industrial mixtures of toluylene 2,4- and 2,6-diisocyanate and mixtures thereof are particularly preferably used.

Instead of the isocyanates, it is also possible to employ compounds which react as isocyanates under the reaction conditions, preferably the addition compounds of alcohols, phenols and lactams, e.g. of phenol, industrial cresol mixtures and caprolactam or pyrrolidone, or of mixtures of the amines corresponding to the isocyanates and aliphatic and aromatic carbonic acid esters, e.g. diethyl carbonate, diphenyl carbonate and ethylene carbonate, which can also already be partly reacted with one another, or e.g. also the polycarbodiimides from the diisocyanates described.

Monofunctional isocyanates, such as e.g. phenyl isocyanate, tolyl isocyanate, cyclohexyl isocyanate, stearyl isocyanate, $\beta$, $\beta$, $\beta$-trifluoroethyl isocyanate and 3,5-bis-trifluoromethyl-phenyl isocyanate or the corresponding amines can also be employed for regulation of the molecular weight.

Carboxylic acids which react monofunctionally under the reaction conditions, such as e.g. phthalic acid or its anhydride, benzoic acid, palmitic acid and N-phenyl- or N-dodecyl-trimellitimide, which can also be substituted by $C_1$-$C_6$-alkyl or halogen (e.g. fluorine or chlorine), can furthermore be employed for regulating the molecular weight.

The polyamide-imides which can be used according to the invention can be prepared in solvents, as is described in DE-AS 1770202. Phenols, such as phenol and industrial mixtures of o-, m- and p-cresols, and furthermore lactams, such as caprolactam or N-methylcaprolactam, tetramethylene sulphone, acid amides, such as dimethylacetamide and dimethylformamide, and ureas, such as tetramethylurea, N,N'-dimethyl-ethylene- and -propyleneurea, are preferably used as the solvents. N-Methylpyrrolidone is particularly preferably employed as the solvent.

To prepare the polyamide-imides which can be used according to the invention, the reaction components are kept at temperatures of 50° to 380° C., preferably 80°-340° C., with or without solvents for a few minutes up to several hours. The course of the reaction can be monitored, for example, via the evolution of gas, the increase in viscosity and the IR spectra.

A preferred embodiment comprises initially introducing the imidocarboxylic acid into a solvent, introducing the diisocyanate in bulk or in solution in the course of 1-10, and preferably 2-6 hours, at temperatures of 80° to 200° C., preferably 110° to 150° C., and then continuing the reaction at temperatures of 120° to 230° C.

The reaction mixture can already be concentrated in the kettle to a melt which is still free-flowing, and then condensed further.

A preferred embodiment comprises carrying out the remainder of the concentration operation, if appropriate with after-condensation, in a devolatilization extruder, if appropriate under a vacuum, at temperatures of 240° to 380° C., preferably 280° to 350° C.

Another preferred embodiment comprises isolating the reaction by precipitation or extraction and then completing the condensation in an extruder or by solid phase condensation.

Polyamide-imides with a relative viscosity, measured on a 1% solution in cresol at 25° C., of 1.5 to 3.0, preferably 1.7 to 2.5 mPas have proved to be particularly suitable.

In general, one equivalent of imidocarboxylic acid is reacted per equivalent of isocyanate, but deviations from these proportions are also possible. In some cases an excess of 0.5 to 5%, preferably 1 to 3% of isocyanate per equivalent of acid has proven advantageous.

The preparation of the polymers according to the invention can be influenced by catalysts, e.g. by bases, such as amines, such as triethylamine, 1,4-diazabicyclo-[2,2,2]-octane, N-ethylmorpholine, N-methylimidazole and 2-methylimidazole, by inorganic and organic metal compounds, in particular compounds of iron, lead, zinc, tin, copper, cobalt and titanium, such as iron(III) chloride, cobalt acetate, lead oxide, lead acetate, tin octoate, dibutyltin dilaurate, copper acetylacetonate, titanium tetrabutylate, alkali metal phenolates and sodium cyanide, by phosphorus compounds, such as trialkylphosphine, methylphospholine oxide, triphenyl phosphite and polyphosphoric acid, and boron compounds, such as boric acid, etc.

For the use according to the invention, the polyamide-imides described can be processed by the processes of powder processing technology, and particularly preferably in the injection moulding process. Other uses according to the invention are the production of profile components by extrusion and of films by the (blow moulding) extrusion process.

The polymers according to the invention are distinguished by a particular heat resistance and elasticity. Their properties can be varied for the various fields of use by admixing low and high molecular weight components, such as fillers, pigments, anti-ageing agents, lubricants and plasticizers, e.g. phenols, such as dodecylphenol, and lactams, such as dodecanelactam, and other polymers.

EXAMPLE 1

152.6 g trimellitimidocaproic acid are initially introduced into 293 g N-methylpyrrolidone. A solution of 122.5 g 4,4'-diisocyanatodiphenylmethane and 4.22 g dodecyl isocyanate in 60 g N-methylpyrrolidone is then added dropwise at 130° C. in the course of 3 hours, while stirring. The condensation takes place with carbon dioxide being split off. The mixture is then stirred at 130° C. afor one hour and at 150°, 170° and 190° C. for in each case 2 hours. 167 g N-methylpyrrolidone are subsequently distilled off in vacuo and the mixture is then stirred at 21° C. for a further 12 hours. The polyamide-imide is obtained as a rubber-like resin with a solids content of 65 wt. % and a relative viscosity $\eta^{25} = 1.51$, measured on a 1% solution in m-cresol at 25° C. The IR spectrum shows bands characteristic for imides at 1720 and 1780 cm$^{-1}$. The glass transition temperature Tg is 177° C., the melt temperature maximum Tm is 267° C. and the heat of melting is $\Delta$ Hs = 48 J/g.

A sample of the resin is evaporated in a stream of nitrogen at 250° and 300° C. in the course of in each case one hour. The polyamide-imide is obtained as a fusible, clear elastic resin with a glass transition temperature Tg = 171° C. and a relative viscosity of $\eta^{25} = 1.85$, measured on a 1% solution in m-cresol at 25° C.

EXAMPLE 2

2,114 g trimellitimidocaproic acid and 50.3 g N-dodecyltrimellitimide are initially introduced into 3,490 g N-methylpyrrolidone in a stirred kettle. A solution of 121.8 g of an industrial mixture of 80% toluylene 2,4- and 20% toluylene 2,6-diisocyanate and 1,593 g 4,4'-diisocyanatodiphenylmethane in 1,400 g N-methylpyrrolidone is then added dropwise at 130° C. in the course of 3 hours.

The mixture is subsequently stirred at 130° C. for 1 hour and at 150°, 170° and 190° C. for in each case 2 hours. It is then diluted with 1,162 g N-methylpyrrolidone to a solids content of 35 wt. %. The polymer is precipitated from this solution with methanol. After drying, the polyamide-imide is obtained as a fibrous yellow powder. The polymer exhibits bands characterisitc for imides at 1720 and 1780 cm$^{-1}$. The relative viscosity is $\eta^{25} = 1.88$, measured on a 1% solution in m-cresol at 25° C.

A sample of the polyamide-imide is pressed at a temperature of 220° C. under a pressure of 200 bar to give a clear elastic shaped article with a glass transition temperature Tg = 172° C.

EXAMPLE 3

A solution of 100 g 4,4'-diisocyanatodiphenylmethane in 80 g N-methylcaprolactam is added dropwise to a solution of 122 g trimellitimidocaproic acid in 200 g N-methylcaprolactam at 130° C. in the course of 3 hours. The mixture is then stirred at 130° C. for a further hour, at 150°, 170°, 190° and 200° C. for in each case 2 hours and at 220° C. for 15 hours. After cooling, the polymer is precipitated from the solution with methanol. The polyamide-imide is obtained as a yellow powder with a glass transition temperature Tg = 170° C. and a relative viscosity $\eta^{25} = 1.65$, measured on a 1% solution in m-cresol at 25° C.

A sample of the resin is pressed at a temperature of 220° C. under a pressure of 200 bar to give a clear elastic shaped article.

EXAMPLE 4

151.1 g trimellitimidocaproic acid, 3.59 g N-dodecyltrimellitimide, 100 g 4,4'-diisocyanatodiphenylmethane and 17.4 g of an industrial mixture of 80% toluylene 2,4- and 20% toluylene 2,6-diisocyanate are introduced into 342 g N-methylpyrrolidone. The mixture is then stirred at 80° for 4 hours, at 120° C. for 4 hours and at 130°, 150°, 170° and 190° C. for in each case 2 hours. 233 g N-methylpyrrolidone are subsequently distilled off in vacuo and the mixture is then stirred at 220° C. for 10 hours. The polyamide-imide is obtained as a clear melt with a solids content of 65 wt. % and a relative viscosity $\eta^{25}=1.73$, measured on a 1% solution in m-cresol.

A sample of the resin is evaporated in a stream of nitrogen at 250° and 310° C. A clear fusible resin with a glass transition temperature Tg=170° C. and a relative viscosity $\eta^{25}=1.98$, measured in m-cresol, is obtained.

EXAMPLE 5

149.6 g trimellitimidocaproic acid, 7.18 g N-dodecyltrimellitimide, 112.5 g 4,4'-diisocyanatodiphenylmethane and 8.40 g hexamethylene diisocyanate are introduced into 240 g N-methylpyrrolidone. The mixture is then stirred at 80°, 120° and 130° C. for in each case 4 hours and at 150°, 170° and 190° C. for in each case 2 hours. The condensation takes place with carbon dioxide being split off. 160 g N-methylpyrrolidone are then distilled off in vacuo and the mixture is stirred again at 220° C. for 10 hours.

The polyamide-imide is obtained as a melt with a solids content of about 74 wt. % and a relative viscosity $\eta^{25}=1.48$, measured on a 1% solution in N-methylpyrrolidone at 25° C.

The melt is evaporated in a stream of nitrogen at 250° and 300° C. A fusible, elastic resin with a glass transition temperature of 165° C. and a $\eta_{rel}=1.92$, measured on a 1% solution in m-cresol at 25° C., is obtained.

EXAMPLE 6

1950 g of trimellitimidoundecanoic acid are dissolved in 3040 g of N-methylpyrrolidone. Then 1300 g of 4,4'-diisocyanatodiphenylmethane in 1040 g of N-methylpyrrolidone are added dropwise at 130° C. in the course of 3 hours. Then the mixture is stirred at 130° C. for one hour. 12.4 g of phenylisocyanate in 130 g of N-methylpyrrolidone are added dropwise and the mixture is stirred for a further hour at 130° C. Then nitrogen is passed over and the reaction is completed at 150°, 170° and 190° C. for in each case 2 hours. The mixture is then diluted with 1000 g of N-methylpyrrolidone until the solids content is 35% by weight. A pale brown viscous solution of the polyamide-imide with a relative viscosity $\eta^{25}$ pf 1.46, measured on a 1% solution in N-methylpyrrolidone at 25° C. is obtained. A sample of the polyamide-imide solution is evaporated in a stream of nitrogen at 250° and 300° C. for in each case one hour. The polyamide-imide is obtained in the form of a pale brown elastic resin with a relative viscosity $\eta^{25}$ of 2.08, measured on a 1% solution in m-cresol. 1250 g methanol are stirred into 5000 g of the polyamide-imide solution prepared according to the example. A solid mass is obtained which is ground with methanol in a geared colloid mill. The polyamide-imide is separated off and extracted once again with methanol. The polyamide-imide is obtained in the form of a yellow powder with a relative viscosity $\eta^{25}$ of 1.76, measured on a 1% solution in m-cresol, a glass transition temperature Tg of 141° C., melt temperature maxima Tm of 239° and 252° C. and a heat of melting Δ Hs of 50 J/g.

We claim:

1. A process for the preparation of shaped articles, comprising shaping polyamide-imides obtained by condensation of organic diisocyanates with imidocarboxylic acids (I) of the formula

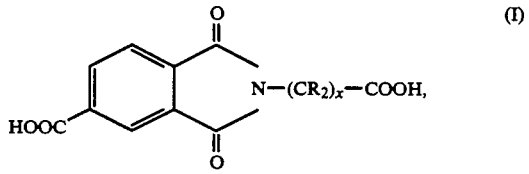

in which

R independently of one another represent Hydrogen (H) or $C_1$-$C_6$-alkyl and x represents the number 1, 2, 3, 4, 5, 6, 7, 8, 9, 10, 11 or 12, at temperatures of 50° to 380° C., optionally in a solvent and optionally in the presence of a catalyst.

2. A process as claimed in claim 1, wherein the shaping is carried out by the injection moulding process, by a process of powder processing technology or by an extrusion process.

3. A process as claimed in claim 1, wherein during the preparation the imidocarboxylic acids (I) are initially introduced in a solvent and the diisocyanates are introduced in portions in the course of 1-10 hours.

4. A process as claimed in claim 1, wherein the polyamide-imide is prepared in a solvent, concentrated by precipitation or extraction and optionally after-condensed in an extruder or in the solid phase.

5. A process as claimed in claim 1, wherein, in the formula for imidocarboxylic acids (I), x denotes the number 10 or 11.

6. A process as claimed in claim 1, wherein the imidocarboxylic acid is selected from ω-trimellitimidocaproic acid, ω-trimellitimidoundecanoic acid or mixtures thereof.

7. A process as claimed in claim 1, wherein the diisocyanates are selected from 4,4'- and 2,4'-diisocyanatodiphenylmethane, 2,4- and 2,6-toluylene diisocyanate, industrial mixtures of toluylene 2,4- and 2,6-diisocyanate and mixtures thereof.

8. A shaped article prepared by the process set forth in claim 1.

* * * * *